United States Patent
Kim et al.

(10) Patent No.: US 8,543,587 B2
(45) Date of Patent: Sep. 24, 2013

(54) COMPOSITE CONTEXT INFORMATION MANAGEMENT APPARATUS AND METHOD OF PROVIDING COMPOSITE CONTEXT INFORMATION USING THE SAME

(75) Inventors: Eung-Ha Kim, Daejeon-si (KR); Su-Kyung Kim, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/420,015

(22) Filed: Mar. 14, 2012

(65) Prior Publication Data

US 2012/0239674 A1    Sep. 20, 2012

(30) Foreign Application Priority Data

Mar. 15, 2011 (KR) ........................ 10-2011-0022766

(51) Int. Cl.
*G06F 7/00* (2006.01)
*G06F 17/30* (2006.01)

(52) U.S. Cl.
USPC ........................................................ 707/758

(58) Field of Classification Search
USPC ................. 707/640, 693, 758, 769, 770
See application file for complete search history.

(56) References Cited

U.S. PATENT DOCUMENTS

| | | | |
|---|---|---|---|
| 8,010,478 B2 | 8/2011 | Lim et al. | |
| 2010/0211545 A1* | 8/2010 | Soni et al. | 707/623 |
| 2010/0318500 A1* | 12/2010 | Murphy et al. | 707/693 |
| 2011/0307490 A1* | 12/2011 | Chow | 707/741 |
| 2012/0124232 A1* | 5/2012 | Kim | 709/231 |

FOREIGN PATENT DOCUMENTS

KR    10-2009-0064937    6/2009

OTHER PUBLICATIONS

Design of Service Management System based on Context Information (Seungkeun Lee et al. pp. 335-344).

* cited by examiner

*Primary Examiner* — Robert Beausoliel, Jr.
*Assistant Examiner* — Nicholas Allen
(74) *Attorney, Agent, or Firm* — Staas & Halsey LLP (57) ABSTRACT

A composite context information management apparatus and a method of providing composite context information using the same. The composite context information management apparatus includes a function providing unit configured to provide a composite context information function corresponding to the operation information from an application control unit; a composite context information processing unit configured to identify pieces of unit contexts and an operation rule based on the composite context information function and the name of the composite context information; and a composite context information presence unit configured to store the pieces of unit contexts corresponding to the name of the composite context information and an instance value for identification of the application and, in response to the application being executed in the user terminal, use the pieces of unit contexts and the operation rule to the user terminal.

15 Claims, 10 Drawing Sheets

COMPOSITE CONTEXT INFORMATION MANAGEMENT APPARATUS AND METHOD OF PROVIDING COMPOSITE CONTEXT INFORMATION USING THE SAME

CROSS-REFERENCE TO RELATED APPLICATION(S)

This application claims the benefit under 35 U.S.C. §119 (a) of Korean Patent Application No. 10-2011-0022766, filed on Mar. 15, 2011, in the Korean Intellectual Property Office, the entire disclosure of which is incorporated herein by reference for all purposes.

BACKGROUND

1. Field

The following description relates to a composite context information management apparatus and a method of providing composite context information using the same, and more particularly, to an composite context management apparatus for generating composite context is information by performing an operation on context information and providing the composite context information to an application and a method for providing the composite context information using the apparatus.

2. Description of the Related Art

A conventional context-aware device is associated only with a particular platform, requiring quite an amount of prior knowledge for adapting the context-aware device in various apparatuses. In addition, since common functions are not made as modules, there is a difficulty in applying the context-aware device to diverse apparatuses.

Recent researches on a composite context service have suggested that common functions necessary for composite context application development are extracted from an application level and provided to a developer in the form of a service infrastructure. According to this method, a composite context information processing service device allows a developer to focus on only functions related to the application of the service device, and provides a user with a generalized application.

However, despite these researches, composite context information processing has not been yet utilized in broad fields.

SUMMARY

The following description relates to a composite context information management apparatus for generating composite context information and providing the information to an application, and a method of providing the composite context information using the composite context information management apparatus.

In one general aspect, there is provided a composite context information management apparatus including: an application control unit configured to receive information about an application to be executed in a user terminal and transmit a name of composite context information required for executing the application and operation information regarding an operation of the application; a function providing unit configured to provide a composite context information function corresponding to the operation information from the application control unit; a composite context information processing unit configured to identify pieces of unit contexts and an operation rule which are included in the composite context information based on the composite context information function and the name of the composite context information which are received from the application control unit; and a composite context information presence unit configured to store the pieces of unit contexts corresponding to the name of the composite context information and an instance value for identification of the application and, in response to the application being executed in the user terminal, transmit composite context information generated based on the pieces of unit contexts and the operation rule to the user terminal.

The application control unit may be connected with a first database which stores composite context information name list and the application control unit may search for composite context information using a name in the composite context information name list.

The composite context information processing unit may be connected with a second database which includes a composite context type ID field, a composite context name field, an index list ID field, and a rule list ID field.

The composite context information processing unit may be connected with a third database to which pieces of unit context information are mapped corresponding to an index ID recorded in the index ID field.

The composite context information processing unit may be connected with a fourth database to which a plurality of logical operators are mapped corresponding to a rule list ID recorded in the rule list ID field.

The composite context information presence unit may be connected with a fifth database which stores ontology information.

The composite context information processing unit may be connected with a fifth database that stores ontology information, identifies a logical language of composite context information which is generated by combining pieces of unit context information identified by the index list ID field and information about logical operators identified by the rule list ID field, and processes the composite context information using the ontology information.

The composite context information present unit may be connected with a sixth database including a presence table which stores the instance value and pieces of unit context information required for composite context information.

In another general aspect, there is provided a composite context information management system including: a user terminal configured to, in response to an application being executed, detect occurrence of pieces of unit context information and perform a particular operation corresponding to a composite context which is generated by performing an operation on the pieces of unit context information; a composite context information management apparatus configured to receive information about the application from the user terminal and provide information about the composite context to the application; an application control unit configured to receive information about an application to be executed in the user terminal and transmit a name of composite context information required for executing the application and operation information regarding an operation of the application; a function providing unit configured to provide a composite context information function corresponding to the operation information from the application control unit; a composite context information processing unit configured to extract and process pieces of unit contexts and an operation rule which are included in the composite context information based on the name of the composite context information and the composite context information function which are received from the application control unit; and a composite context information presence unit configured to store the pieces of unit contexts corresponding to the name of the composite context information and an instance value for identification of the application and, in response to the application being executed in the user terminal, transmit composite context information generated based on the pieces of unit contexts and the operation rule to the user terminal.

In another general aspect, there is provided a method of providing composite context information corresponding to a result of performing an operation on pieces of unit context information using logical operators in a user terminal, the method including: receiving an application from the user terminal; receiving a function corresponding to the application and acquiring at least one of pieces of unit context information required for the composite context information by using a name of the composite context information required for a function requested by the application; and transmitting the acquired information from the application corresponding to an instance value for identification of the application.

The method, wherein the function is a composite context information request function, may further include providing the user terminal with a result of processing composite context information by combining unit context information, which constitutes composite context information requested, and information about logical operators and using a database storing ontology information.

The method, wherein the function is a composite context information reservation function, is may further include identifying unit context information included in composite context information to be reserved, and storing the identified unit context information in a database stored in a presence table.

The method, wherein the function is a composite context information notification function, may further include, in response to detecting occurrence of unit context information stored in a database present in a presence table, identifying composite context information including the unit context information, extracting a logical operator corresponding to the composite context, and providing a user terminal with a result of processing the composite context information by combining unit context information, which constitutes composite context information, and the extracted logical operator and using a database storing ontology information.

The method, wherein the function is a composite context information addition function, may further include generating fields which store information about unit context information to be mapped to composite context information requested to be added and information about logical operators to be applied to the unit context information to generate the composite context information.

The method, wherein the function is a composite context information removal function, may further include removing fields which store unit context information to be mapped to composite context information requested to be removed and information about logical operators to be mapped to the unit context information.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
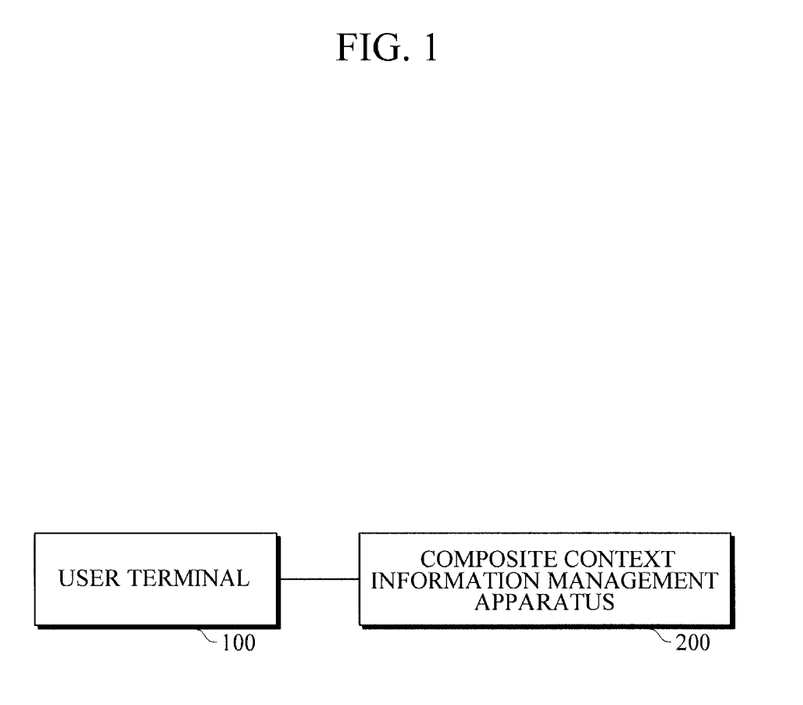
FIG. 1 is a diagram illustrating an example of a context information management system.

FIG. 1 is a diagram illustrating an example of a context information management system.

Referring to FIG. 1, context information management system may include a user terminal 100 and a composite context information management apparatus 200.

The user terminal 100 may include a smartphone, a personal computer, and the like, on which an application in use of composite context information is executed. The user terminal 100 may detect a number of unit contexts, such as current time, changes in a surrounding environment, the occurrence of a specific action, and the like, and transmit information of the detected unit context to the composite context information management apparatus 200. In addition, the user terminal 100 may include a user interface unit, through which a user specifies settings of pieces of unit context information to be transmitted to the composite context information management apparatus 200 and sets a particular logical operator to be applied to the pieces of unit context information. The user terminal 100 may check whether composite context information requested by an application is present in a composite context information list, which is set by the composite context information management apparatus 200, through the user interface unit, and may adjust the composite context information list. In addition, the user terminal 100 may notify the user of the occurrence of an event corresponding to the composite context information through the user interface unit.

The composite context information management unit 200 may specify settings of pieces of unit context information and define a number of logical operators. The unit context information may include setting of specific time, for example, 10 a.m., 5 p.m., etc. changes in a specific environment, for example, turning light off or on in a particular room, and the occurrence of a particular event, for example, receiving an email from a particular sender, sending an email to a particular recipient, and visiting a particular person. The operators for use may include AND, OR, NOR, NOT, and the like. Combining these operators with the unit context information may produce various pieces of context information. The unit context information and operators described herein are provided as examples, and a user may arbitrarily specify the unit context information and operators.

In addition, the composite context information management apparatus 200 may perform operations on the pieces of unit context information with the operators to define a composite context event. That is, the composite context is set by applying selected operators to pieces of selected unit context information.

Figure 2:
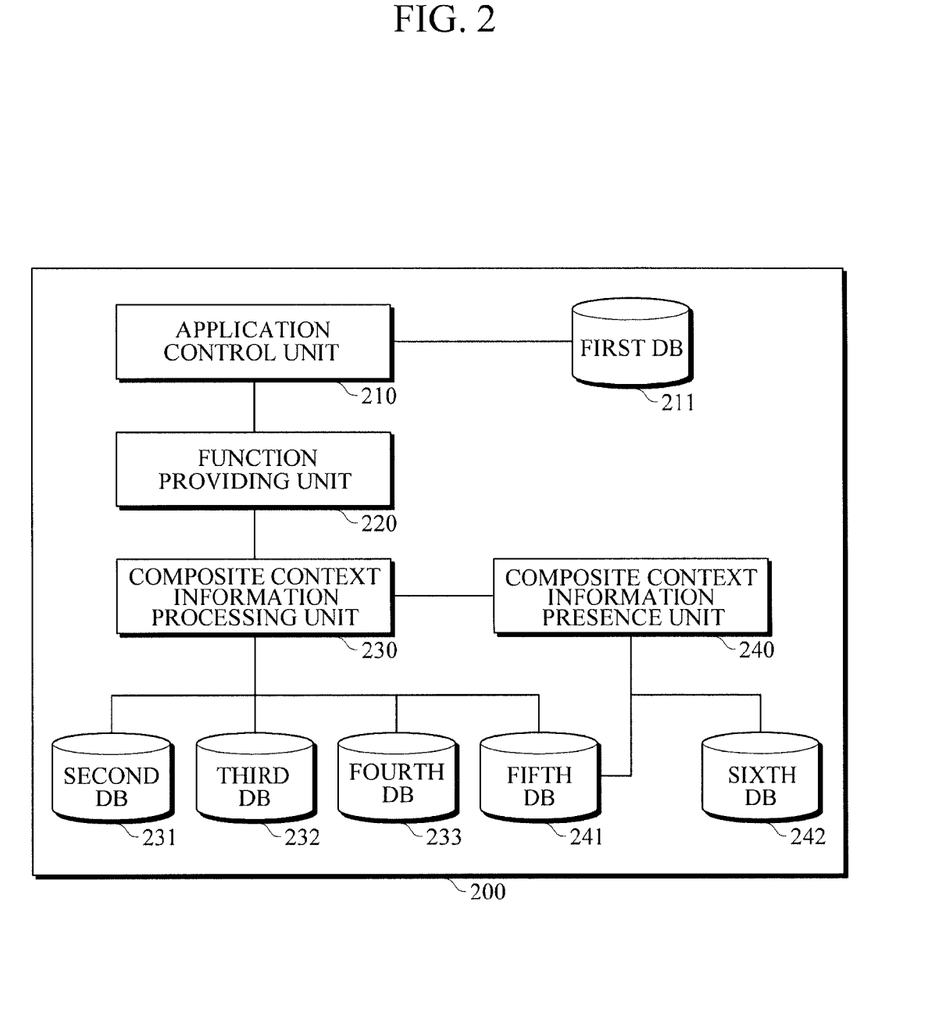
FIG. 2 is a diagram illustrating an example of a composite context information management apparatus shown in FIG. 1.

FIG. 2 is a diagram illustrating an example of a composite context information management apparatus shown in FIG. 1.

Referring to FIG. 2, composite context information management apparatus 200 may include an application control unit 210, a function providing unit 220, a composite context information processing unit 230, and a composite context information presence unit 240.

The application control unit 210 may provide a user interface and be connected with a first database 211 that stores a composite context information list. In addition, the application control unit 210 may determine whether composite context information required to execute a function of an application running in the user terminal 100 (refer to FIG. 1) is present in the composite context information list. If the composite context information list includes the composite context information required to execute the function of the application, the application control unit 210 may request the composite information text processing unit 230 for composite context information necessary for a specific application.

The function providing unit 220 may store functions about the composite context information required for a function of an application being provided by the user terminal 100, and provide the functions. The functions to be provided by the function providing unit 220 may include a composite context information request function, a composite context information reservation function, a composite context information occurrence notification function, a composite context information addition function, a composite context information removal function, and the like. The composite context information request function is to request processing of composite context information by combining pieces of unit context information constituting a specific composite context with logical operators to be applied to the respective context information. The composite context information reservation function is to reserve a specific composite context, and the composite context information occurrence notification function is to notify of the occurrence of a scheduled specific composite context. The composite context information addition function is to add a specific composite context to the composite context information list, and the composite context information removal function is to remove a specific composite context from the composite context information list.

The composite context information processing unit 230 may be connected with a second database 231, a third database 232, a fourth database 233, and a fifth database 241. The second database 231 includes a composite context information type database, the third database 232 includes composite context information index type information, the fourth database 233 includes rule list information, and the fifth database 241 includes ontology information.

The composite context information processing unit 230 may operate in response to a is function called from the function providing unit 220.

The composite context information presence unit 240 may be connected with a sixth database 242 storing a presence table, and store pieces of unit context information in the presence table corresponding to results of analyzing composite contexts. In addition, the composite context information presence unit 240 may detect the occurrence of unit context information, and recognize composite context information containing unit contexts from the sixth database 242. Moreover, the composite context information presence unit 240 may be connected with the fifth database 241.

If a called function is a composite context information request function, the composite context information processing unit 230 may search for a name of requested specific composite context information from the composite context information list present in the first database 211. In addition, the composite context information processing unit 230 may extract an index list identification (ID) corresponding to a composite context information type and a rule list ID corresponding to the name of the composite context information from the second database 231. Then, the composite context information processing unit 230 may extract unit context information from the third database 232 based on the index list ID, and extract a logical operator to be applied to the unit context information from the fourth database 233 based on the rule list ID. The composite context information processing unit 230 may analyze description language of composite context information resulting from the combination of the extracted unit context information and the logical operator, and process the composite context information based on the ontology information present in the fifth database 241. Thereafter, the composite context information processing unit 230 may transmit a result of processing the composite context information to the user terminal 100 through the application control unit 210. The ontology information may include a wide range of information, and consist of static context information, which is relatively non-changeable, and dynamic context information, which is real-time state information being generated with respect to various media used by a user and being generated from user information and external environment information during the user's access to a system. The ontology information may be constructed using user-related information (a type of a terminal, a physical location of the user, etc.) network-related information (bandwidth, delay time, security level, etc.), and service-related information (a physical location of a service application server, a processing time, a service usage charge, etc.). In addition, the ontology information may further include information newly generated in relation to the existing information. The composite context information processing unit 230 transmits the result of processing the composite context information to the user terminal 100, the composite context information being processed by applying the ontology information according to a logical language generated from the combination of the unit context information and the logical operation rule, which are extracted through the second database 231 including the composite context information type database.

In addition, a particular application executed in the user terminal 100 may perform appropriate service logic according to the received result of processing the composite context information.

If the called function is a composite context information reservation function, the composite context information processing unit 230 may extract index list ID information corresponding to particular composite context information from the composite context information type database of the second database 231 by use of a name of the requested composite context information as a keyword. In addition, based on index list ID information present in the third database 232, the composite context information processing unit 230 may extract pieces of unit context information that constitute context information requested to be reserved. The pieces of extracted unit context information, the name of the composite context information, and an instance value for identification of an application that requests the composite context information reservation are stored in the presence table constructed in the sixth database 242 that is managed by the composite context presence unit 240. The composite context presence unit 240 may transmit a result of reservation of the composite context information to the composite context information processing unit 230 and the function providing unit 220. The function providing unit 220 may transmit the reservation result to the user terminal 100 through the application control unit 210. In addition, the composite context information presence unit 240 may detect the occurrence of unit context information corresponding to the unit context information present in the presence table within the sixth database 242, and search for a name of the composite context information that contains the corresponding unit context information. In addition, the composite context information processing unit 230 may request the function providing unit 230 to provide a composite context information notification function. In response to the composite context information notification function being received, the composite context information processing unit 230 may use a name of the composite context information containing the occurring unit context information as a keyword. In other words, by using the name of the composite context information, a rule list for generating the composite context information is identified, and logical operators corresponding to the rule list are extracted. The composite context information processing unit 230 may generate composite context information using the extracted logical operators and the unit context information present in the presence table constructed in the sixth database 242. Then, the composite context information processing unit 230 may complete processing of the composite context information by analyzing description language of the generated composite context information based on the ontology information present in the fifth database 241. Thereafter, the composite context information presence unit 240 may transmit the instance value of an application being stored in the present table along with the result of processing to the function providing unit 220 through the composite context information processing unit 230. The function providing unit 220 may transmit the result of processing and the instance value of the application to the application control unit 210, and the application control unit 210 may transmit a result of the occurrence of the composite context to the user terminal 100. Accordingly, the user terminal 100 is allowed to use the composite context information result in an application that corresponds to the instance value.

The above-described applications may use composite context information defined by the composite context information processing apparatus or may define composite context information for use.

In addition, if the called function is a composite context information addition function, the composite context information processing unit 230 may add pieces of unit context information that constitute composite context information defined by the application to the composite context information index list, and add logical operators that constitute a composite context information rule defined by the application to the composite context information rule list. Then, new composite context information type ID information is generated by adding the composite context information name defined by the application, an index list ID and a rule list ID to a new composite context information type database, and in response, the second database is updated. Then, the new composite context information type ID information is transmitted to the function providing unit 220, and in response, the function providing unit 220 transmits the new composite context information type ID information to the user terminal 100 through the application control unit 210.

In addition, if the called function is a composite context information removal function, the composite context information processing unit 230 may extract index list ID information and rule list ID information from the composite context information type database based on the composite context information type ID information. Base on the extracted index list ID information, pieces of unit context information that constitute the composite context information defined by the application are removed from the composite context information index list. Based on the extracted rule list ID information, the logical operators that constitute the composite context information rule defined by the application are removed from the composite context information rule list. Then, the composite context information name and relevant information corresponding to the composite context information type ID information are removed from the composite context information type database. A result of removing is transmitted to the function providing unit 220, and the function providing unit 220 transmits the received result to the application control unit 210. The application control unit 210 transmits the result of removing to the user terminal 100.

Figure 3:
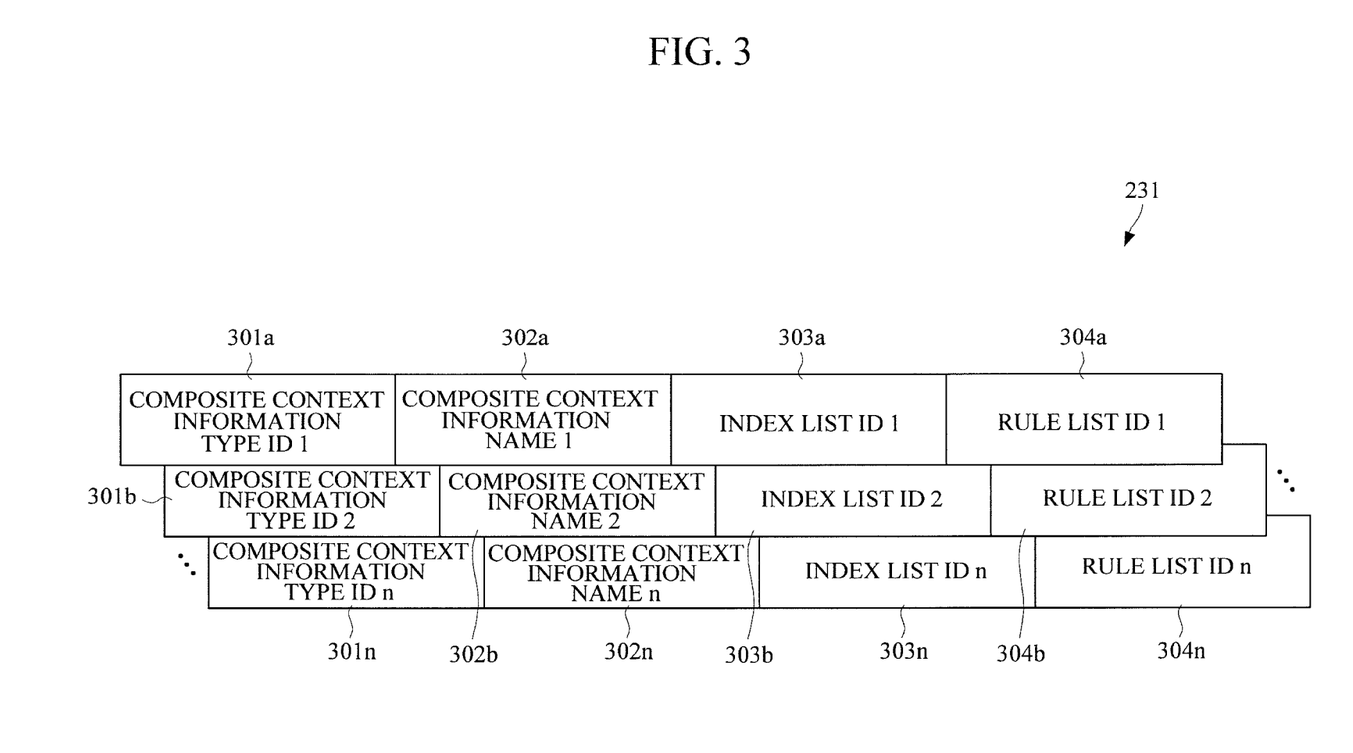
FIG. 3 is a diagram illustrating an example of a second database illustrated in FIG. 2.

FIG. 3 is a diagram illustrating an example of a second database illustrated in FIG. 2.

Referring to FIG. 3, second database 231 may include a composite context information type ID field 301, a composite context information name field 302, an index list ID filed 303, and a rule list ID field 304. The composite context information type ID field 301 is to distinguish the types of composite context information, the composite context information name field 302 is to identify a name of composite context information included in a called function, the index list ID field 303 is to store a list of unit context information corresponding to the name of the composite context information, and the rule list ID field 304 is to correspond to the name of the composite context information.

Accordingly, with reference to the second database 231, the name of the composite context information is applied to the composite context information name field 302 to identify the index list ID field 303 and the rule list ID field 304, pieces of unit context information are identified based on the index list ID field 303, and logical operator information is identified based on the rule list ID field 304.

Figure 4:
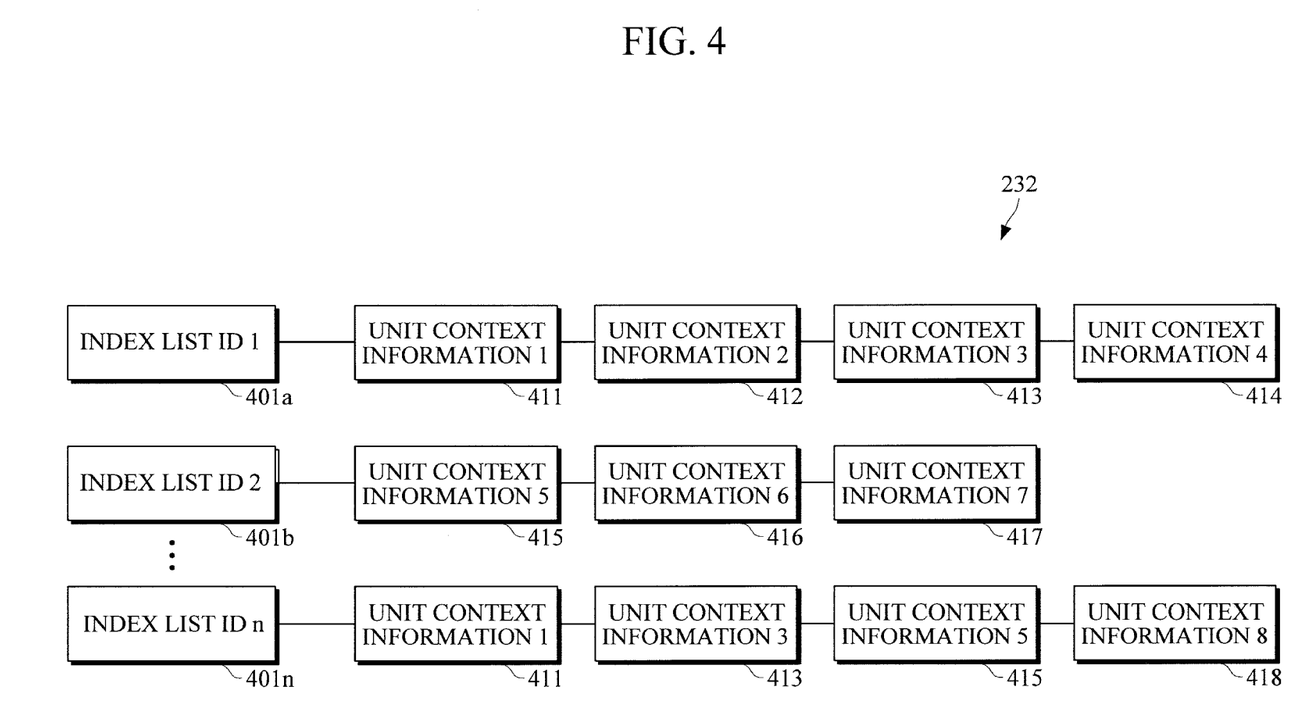
FIG. 4 is a diagram illustrating an example of a third database illustrated in FIG. 2, in which stored index list ID is mapped with unit context information.

FIG. 4 is a diagram illustrating an example of a third database illustrated in FIG. 2, in which stored index list ID is mapped with unit context information.

Referring to FIG. 4, third database 232 may include index list ID 1 402a, index list ID 2 402b, and index list ID n 402n, which correspond to the index list ID field 303 of the second database 231. In addition, the respective index list IDs 402a, 402b, . . . , and 402n are mapped with unit context information required for composite context information.

For example, the index list ID 1 401a is allocated unit context information 1 411, unit context information 2 412, unit context information 3 413, and unit context information 4 414, and the index list ID 2 412 is allocated unit context information 5 415, unit context information 6 416, and unit context information 7 417. The index list ID n 401n is allocated unit context information 1 411, unit context information 3 413, unit context information 5 415, and unit context information 8 418. The relationship between unit context information allocated to the composite context information is only for purposes of example, the type and number of the unit context information allocated to the composite context information may vary and may be determined by a user.

Figure 5:
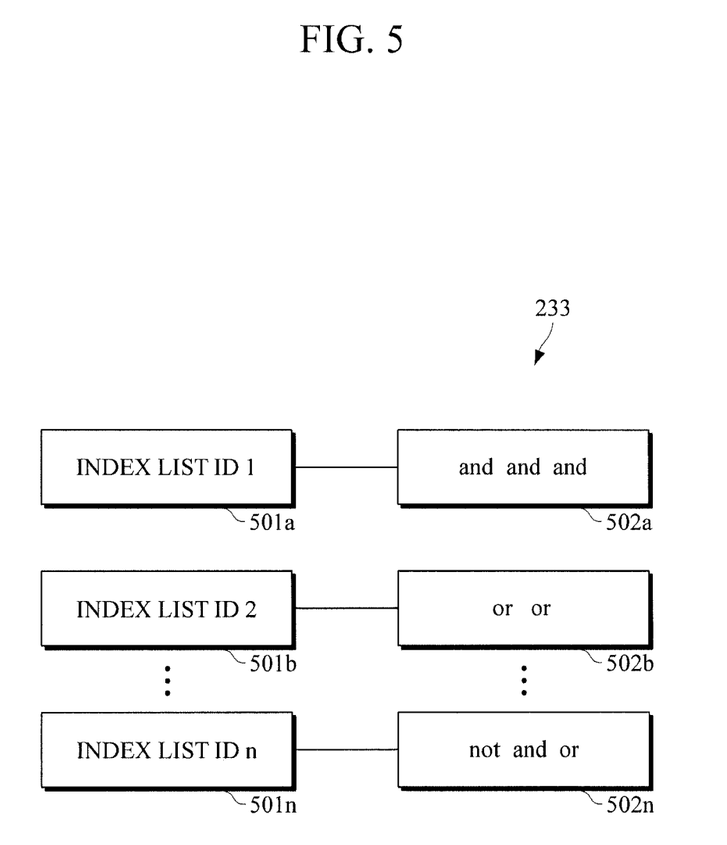
FIG. 5 is a diagram illustrating an example of a fourth database illustrated in FIG. 2, in which stored rule list IDs are mapped with logical operators.

FIG. 5 is a diagram illustrating an example of a fourth database illustrated in FIG. 2, in which stored rule list IDs are mapped with logical operators.

Referring to FIG. 5, fourth database 233 may include rule list IDs 501a, 501b, . . . , and 501n, which correspond to the composite context information type ID field 301 of the second database 231.

In addition, rule list ID 1 501a is allocated logical operators, AND, AND, and AND, rule list ID 2 501b is allocated logical operators, OR and OR, and rule list ID n 501n is allocated is logical operators, NOT, AND, and OR. The above logical operators allocated to the rule list IDs are only for purpose of example, and the types and number of logical operators to be allocated to each of the rule list IDs may vary and may be determined by a user.

Operators present in the rule list are applied for operation of pieces of unit context information being allocated to one index list ID according to a rule list which is set corresponding to the composite context information type ID. For example, if the index list ID 1 501a is allocated unit context information 1 411, unit context information 2 412, unit context information 3 413, and unit context information 4 414 and the rule list 1 502a includes operators, AND, AND, and AND, the composite context information processing unit 230 may apply an AND operator to the unit context information 1 411 and the unit context information 2 412 to output a first AND operation result. Then, the composite context information processing unit 230 may apply an AND operator to the first AND operation result and the unit context information 3 413 to output a second AND operation result, and then apply an AND operator to the second AND operation result and the unit context information 4 414 to generate one composite context that is identified by the composite context information type ID 1 301.

In addition, if the index list ID 2 501b is allocated unit context information 5 415, the unit context information 6 416, and the unit context information 7 417 and the rule list 2 501b includes operators, OR and OR, the composite context information processing unit 230 may apply an OR operator to the unit context information 5 415 and the unit context information 6 416 to output a first OR operation result, and apply an OR operator to the first OR operation result and the unit context information 7 417 to generate one composite context that is identified by the composite context information ID 2 301b.

Furthermore, if the index list ID n 402n is allocated the unit context information 1 411, the unit context information 3 413, the unit context information 5 415, and the unit context information 8 418 and the rule list n 501n includes operators, NOT, AND, and OR, the composite context information processing unit 230 may apply a NOT operator to the unit context information 1 411 and the unit context information 3 413 to output a first NOT operation result, and apply an AND operator to the first NOT operation result and the unit context information 5 415 to output a second AND operation result. Then, the composite context information processing unit 230 may apply an OR operator to the second AND operation result to generate one composite context that is identified by the composite context information type ID n 301n.

Figure 6:
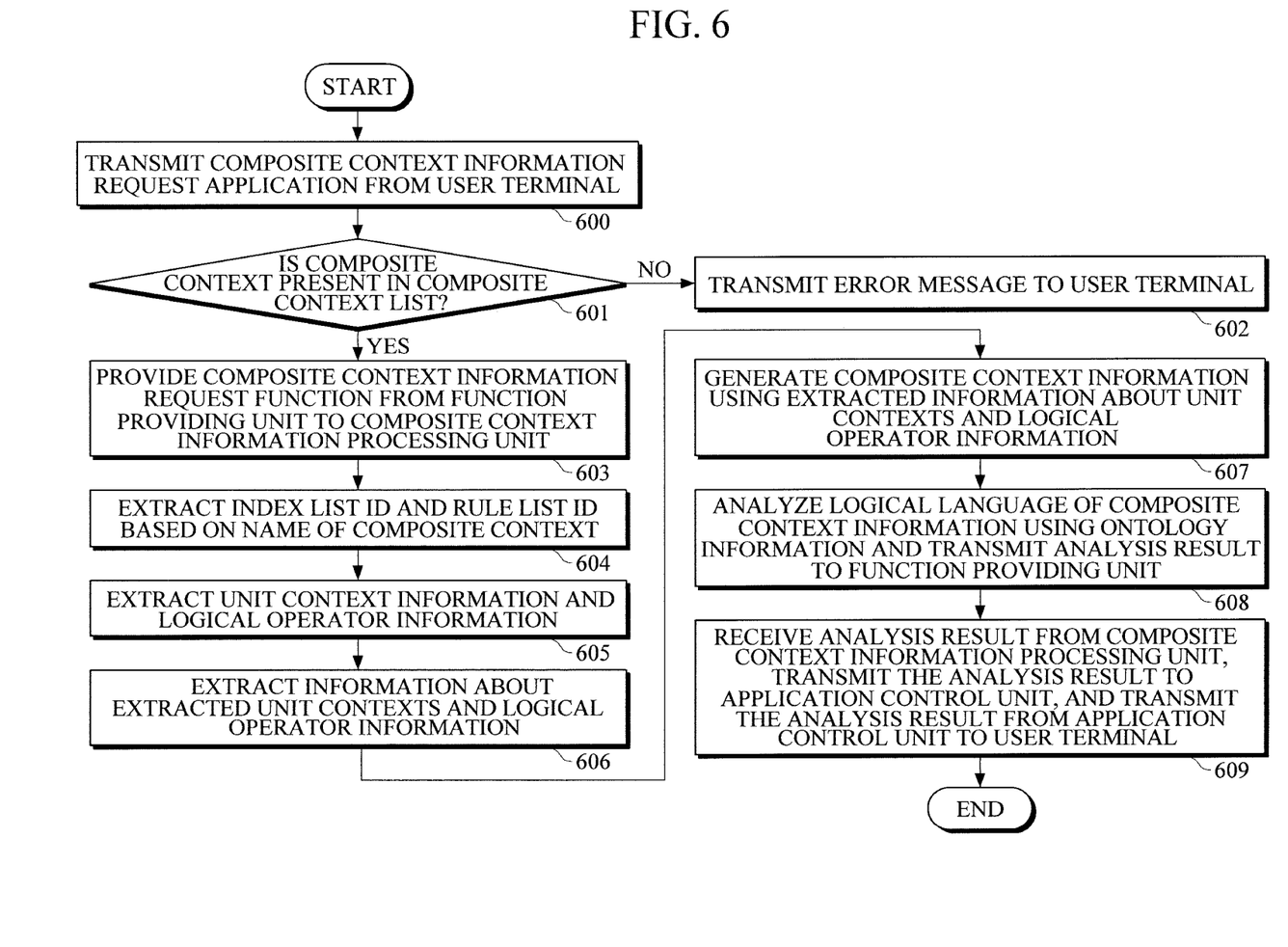
FIG. 6 is a flowchart illustrating an example of a method of a composite context information management apparatus illustrated in FIG. 2 for requesting composite context information.

FIG. 6 is a flowchart illustrating an example of a method of a composite context information management apparatus illustrated in FIG. 2 for requesting composite context information.

Referring to FIG. 6 in conjunction with FIG. 2, the application control unit 210 receives a composite context information request application that requests information of a particular composite context from the user terminal 100 in operation 600. A name of the particular composite context is used to request the information of the particular composite context. The application control unit 210 determines whether the particular composite context is present in the composite context information list included in the first database 211 based on the name of the particular composite context in operation 601. If the particular composite context is not present in the composite context information list, the application control unit 210 transmits an error message to the user terminal 100 in operation 602. If the particular composite context is present in the composite context information list, the function providing unit 220 provides a composite context information request function to the composite context information processing unit 230 in operation 603. The composite context information processing unit 230 extracts an index list ID and a rule list ID from the composite context information type database in the second database 231 by use of the name of the particular composite context, whose information is requested by the composited context information function, as a keyword in operation 604. Then, pieces of unit context information that constitute the composite context are extracted from the third database 232 based on the index list ID in operation 605, and information about a logical operation rule is extracted from the fourth database 233 based on the rule list ID in operation 606. Then, the composite context information processing unit 230 generates composite context information using the extracted unit context information and logical operation rule in operation 607. Then, the composite context information processing unit 230 analyzes a logical language of the composite context information generated by use of the extracted unit context information and logical operation rule, and transmits to the function providing unit 220 a result of processing the composite context information using ontology information present in the fifth database 241 in operation 608. The function providing unit 220 transmits the result received from the composite context information processing unit 230 to the user terminal 100 through the application control unit 210 in operation 609.

Figure 7:
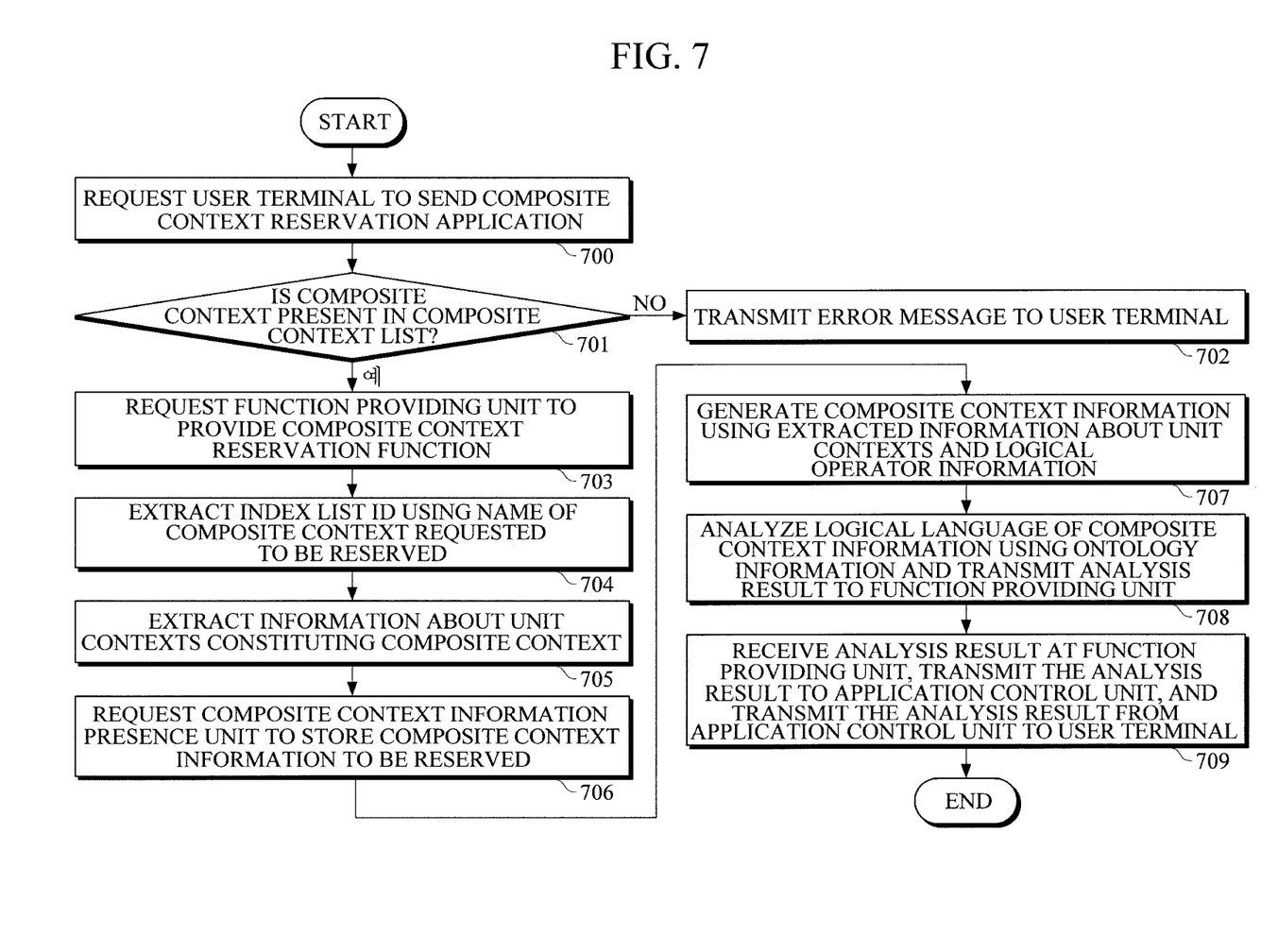
FIG. 7 is a flowchart of an example of a method of a composite context information management apparatus illustrated in FIG. 2 for reserving a composite context.

FIG. 7 is a flowchart of an example of a method of a composite context information management apparatus illustrated in FIG. 2 for reserving a composite context.

Referring to FIG. 7, in conjunction with FIG. 2, the application control unit 210 receives a composite context information reservation application that reserves a particular composite context from the user terminal in operation 700. A name of the particular composite context is used to request information about the particular composite context. The application control unit 210 determines whether the particular composite context information to be reserved is present in the composite context information list present in the first database 211 by use of the name of the particular composite context information in operation 701. If the particular composite context information is not present in the composite context information list, the application control unit 210 transmits an error message to the user terminal 100 in operation 702. If the particular composite context information is present in the composite context information list, the composite context information processing unit 230 requests the function providing unit 220 to provide a composite context information reservation function in operation 703. The composite context information processing unit 230 extracts an index list ID from the composite context information type database present in the second database 231 by using the name of the particular composite context information to be reserved by the composite context information reservation function as a keyword in operation 704. In addition, by using the index list ID, pieces of unit context information that constitute a composite context are extracted from the third database 232 in operation 705. The composite context information processing unit 230 requests the composite context information presence unit 240 to store the unit context information that constitute the composite context to be reserved in operation 706. The composite context information presence unit 240 stores the unit context information in the presence table present in the fourth database 233 in operation 707. If the pieces of unit context information are stored in the presence table, the composite context information presence unit 240 determines that the reservation is made, and notifies the composite context information processing unit 230 of the completion of the composite context, and the composite context information processing unit 230 transmits a notification to the function providing unit 220 to inform of the completion of the reservation of the composite context in operation 708. In response to the notification being received, the function providing unit 220 transmits the notification to the application control unit 210, and the application control unit 210 transmits a result of reservation to the user terminal 100 to inform the user of the completion of the reservation in operation 709.

Figure 8:
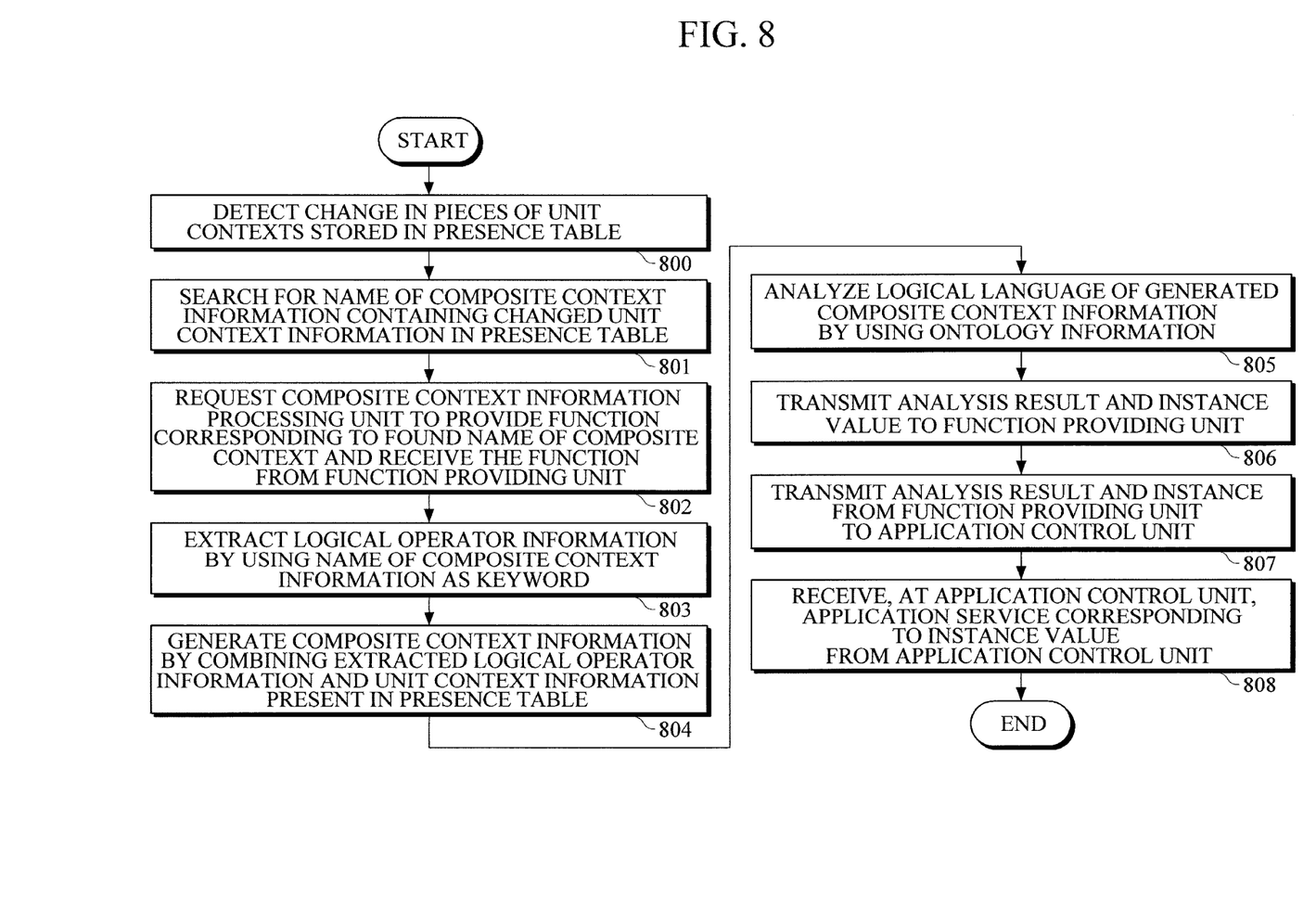
FIG. 8 is a flowchart illustrating an example of a method of a composite context information management apparatus illustrated in FIG. 2 for detecting whether a reserved composite context occurs.

FIG. 8 is a flowchart illustrating an example of a method of a composite context information management apparatus illustrated in FIG. 2 for detecting whether a reserved composite context occurs.

Referring to FIG. 8 in conjunction with FIG. 2, when a particular application is running in the user terminal 100, the composite context information management apparatus 200 performs the transmission of a composite context information notification application to the particular application. In response to an event, such as a change in content, being detected in unit context information present in a presence table by the composite context information presence unit 240 in operation 800, the application control unit 210 searches for a name of composite context information, which includes the changed unit context information, in the presence table in operation 801. Then, the application control unit 210 requests the function providing unit 220 to provide a composite context information notification function in operation 802. The composite context information processing unit 230 receives a name of the composite context information and the composite context information notification function, uses the name of the composite context information as a keyword to extract an index list ID and a rule list ID from the second database 231, and uses the extracted index list ID to extract unit context information from the third database 232 and uses the extracted rule list ID to extract logical operators from the fourth database 233 in operation 803. In addition, the composite context information processing unit 230 uses the extracted unit context information and logical operators to generate composite context information in operation 804. The composite context information processing unit 230 analyzes a logical language of the composite context information using ontology information present in the fifth database 241 in operation 805, and transmits a result of analysis and an instance value for identification of the application to the function providing unit 220 in operation 806. The function providing unit 220 transmits the received result of analysis and instance value to the application control unit 210 in operation 807. The application control unit 210 transmits the received result of analysis and instance value of the user terminal 100 in operation 808.

Figure 9:
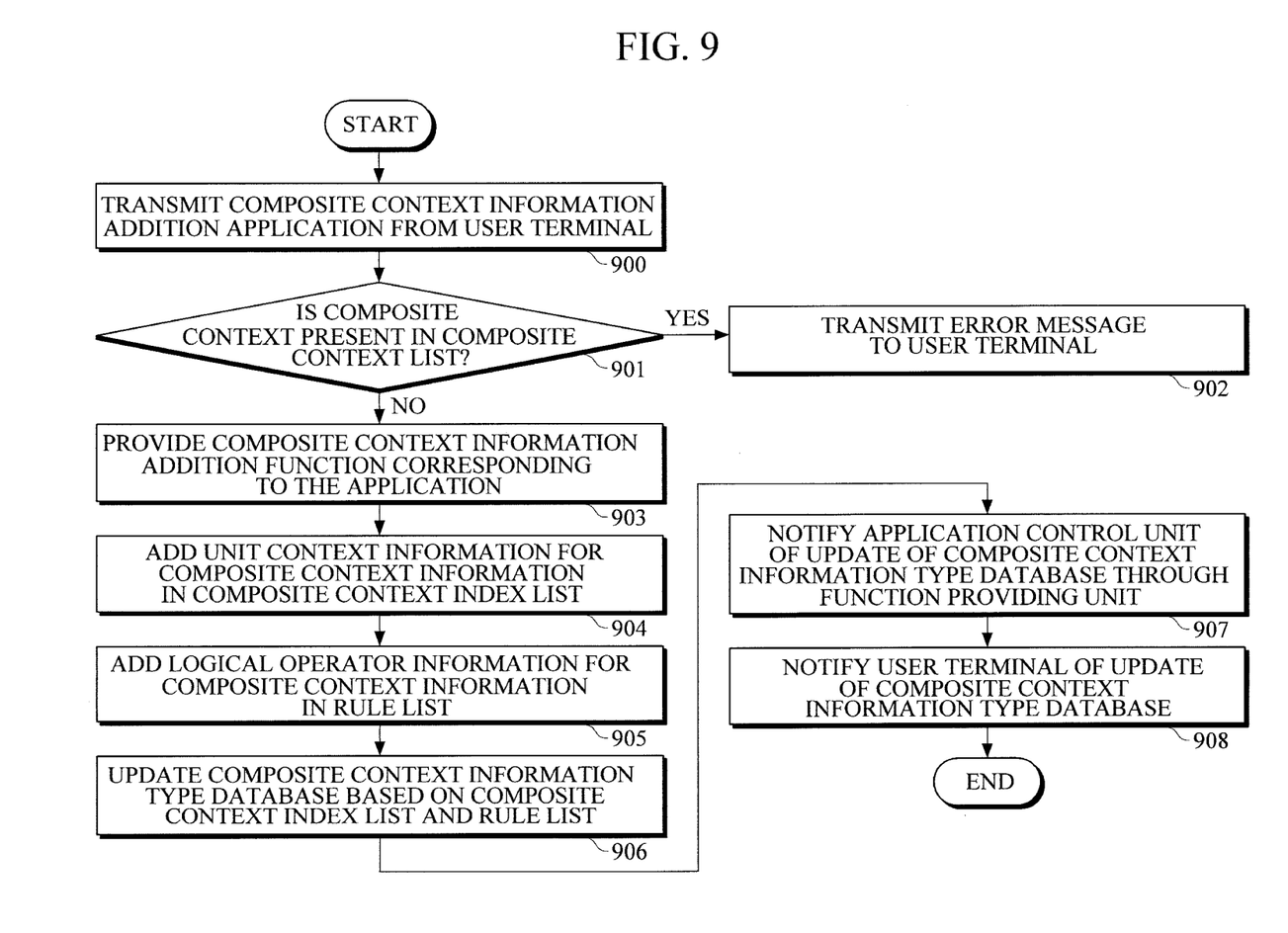
FIG. 9 is a flowchart illustrating an example of a method of the composite context information management apparatus illustrated in FIG. 2 for adding a composite context.

FIG. 9 is a flowchart illustrating an example of a method of the composite context information management apparatus illustrated in FIG. 2 for adding a composite context.

Referring to FIG. 9 in conjunction with FIG. 2, the application control unit 210 receives a composite context information addition application to which the user terminal 100 adds particular composite context information in operation 900. A name of the particular composite context information is used in adding the particular composite context information. The application control unit 210 uses the name of the particular composite context information to determine whether the particular composite context information is present in the composite context information list stored in the first database 211 in operation 901. If the particular composite context information is present in the composite context information list, the application control unit 210 transmits an error message to the user terminal 100 in operation 902. If the particular composite context information is not present in the composite context information list, the function providing unit 220 controls a composite context information addition function to be provided to the composite context information processing unit 230 in operation 903. The composite context information processing unit 230 adds an index list ID, which corresponds to the name of the requested particular composite context information, using the received composite context information addition function in operation 904, and connects the added index list ID with unit context information being included in composite context information defined by the application. Logical operators required for the composite context information defined by the application are added to a rule list in operation 905. In addition, by using the composite context index list and the rule list, to each of which the corresponding new ID is added, the composite context information type database is updated in operation 906. The composite context information processing unit 230 notifies the application control unit 210 of the update of the composite context information type database through the function providing unit 220 in operation 907. The application control unit 210 notifies the user terminal 100 of the update of the composite context information type database in operation 908.

Figure 10:
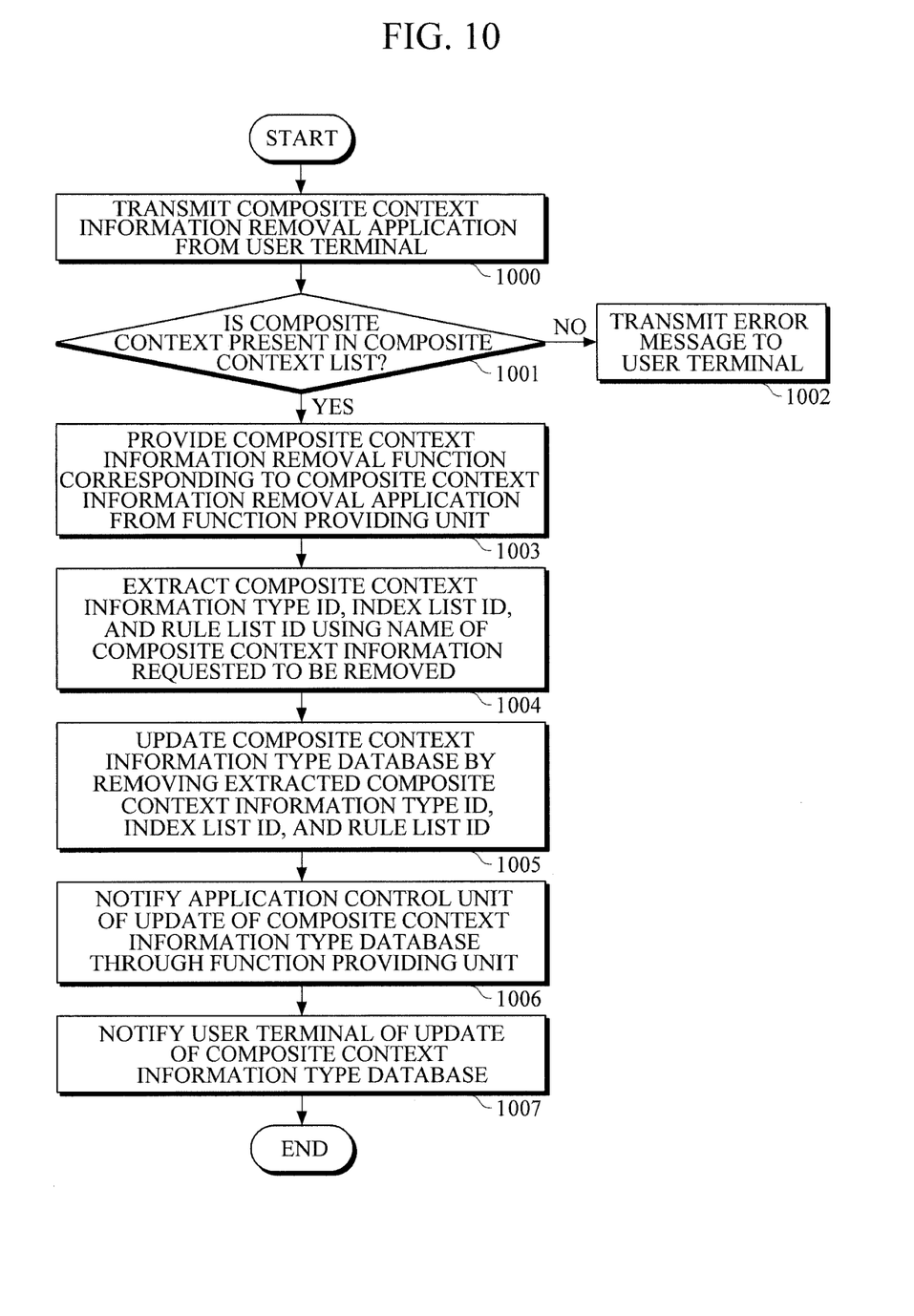
FIG. 10 is a flowchart illustrating an example of a method of a composite context information management apparatus illustrated in FIG. 2 for removing a composite context.

FIG. 10 is a flowchart illustrating an example of a method of a composite context information management apparatus illustrated in FIG. 2 for removing a composite context.

Referring to FIG. 10 in conjunction with FIG. 2, the application control unit 210 receives a composite context information removal application from the user terminal 100 to remove information about a particular composite context in operation 1000. A name of the particular composite context is used to remove the composite context. The application control unit 210 uses the name of the particular composite context to determine whether the particular composite context is present in the composite context information list stored in the first database 211 in operation 1001. If the particular composite context is not present in the composite context information list, the application control unit 210 transmits an error message to the user terminal 100 in operation 1002. If the particular composite context is present in the composite context information list, the function providing unit 220 provides a composite context information removal function to the composite context information processing unit 230 in operation 1003. The composite context information processing unit 230 extracts a composite context information type ID, an index list ID, and a rule list ID using the name of the particular composite context information requested to be removed by the composite context information removal function in operation 1004. Then, the composite context information processing unit 230 removes the extracted composite context information type ID from the second database 231, the index list ID from the third database 232, and the rule list ID from the fourth database 233, and then updates the composite context information type database in the second database 231, the index list ID information stored in the third database 232, and the rule list ID information within the fourth database 233 in operation 1005. Then, the composite context information processing unit 230 notifies the application control unit 210 of the update of the composite context information type database through the function providing unit 220 in operation 1006, and the application control unit 210 notifies the user terminal 100 of the update of the composite context information type database in operation 1007.

As described above, according to the composite context information management apparatus and a method of providing composite context information using the apparatus, an application developer is enabled to develop various context-aware services with ease and share such services with other developers, so that an open service development environment can be established, which can overcome the restriction of a conventional closed context-aware service development environment. In addition, it may play a leading role to provide a technical mechanism which can create a new service sector in a communication service field, such as a future Internet service control infrastructure and a user-oriented context awareness service. Further, in developing various context-aware services as potential new business models, such services are designed to reuse existing or future composite context information elements, thereby allowing a context-awareness apparatus to be reused, and thus a context awareness service development cost can be reduced.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A composite context information management apparatus comprising:
   an application control unit configured to receive information about an application to be executed in a user terminal and transmit a name of composite context information required for executing the application and operation information regarding an operation of the application;
   a function providing unit, executed by a computer, configured to provide a composite context information function corresponding to the operation information from the application control unit;
   a composite context information processing unit configured to identify pieces of unit contexts and an operation rule which are included in the composite context information based on the composite context information function and the name of the composite context information which are received from the application control unit; and
   a composite context information presence unit configured to store the pieces of unit contexts corresponding to the name of the composite context information and an instance value for identification of the application and, in response to the application being executed in the user terminal, transmit composite context information generated based on the pieces of unit contexts and the operation rule to the user terminal.

2. The composite context information management apparatus of claim 1, wherein the application control unit is connected with a first database which stores composite context information name list and the application control unit searches for composite context information using a name in the composite context information name list.

3. The composite context information management apparatus of claim 1, wherein the composite context information processing unit is connected with a second database which includes a composite context type ID field, a composite context name field, an index list ID field, and a rule list ID field.

4. The composite context information management apparatus of claim 3, wherein the composite context information processing unit is connected with a third database to which pieces of unit context information are mapped corresponding to an index ID recorded in the index ID field.

5. The composite context information management apparatus of claim 3, wherein the composite context information processing unit is connected with a fourth database to which a plurality of logical operators are mapped corresponding to a rule list ID recorded in the rule list ID field.

6. The composite context information management apparatus of claim 1, wherein the composite context information presence unit is connected with a fifth database which stores ontology information.

7. The composite context information management apparatus of claim 3, wherein the composite context information processing unit is connected with a fifth database that stores ontology information, identifies a logical language of composite context information which is generated by combining pieces of unit context information identified by the index list ID field and information about logical operators identified by the rule list ID field, and processes the composite context information using the ontology information.

8. The composite context information management apparatus of claim 6, wherein the composite context information present unit is connected with a sixth database including a presence table which stores the instance value and pieces of unit context information required for composite context information.

9. A composite context information management system comprising:
   a user terminal configured to, in response to an application being executed, detect occurrence of pieces of unit context information and perform a particular operation corresponding to a composite context which is generated by performing an operation on the pieces of unit context information;
   a composite context information management apparatus configured to receive information about the application from the user terminal and provide information about the composite context to the application;
   an application control unit configured to receive information about an application to be executed in the user terminal and transmit a name of composite context information required for executing the application and operation information regarding an operation of the application;
   a function providing unit configured to provide a composite context information function corresponding to the operation information from the application control unit;
   a composite context information processing unit configured to extract and process pieces of unit contexts and an operation rule which are included in the composite context information based on the name of the composite context information and the composite context information function which are received from the application control unit; and a composite context information presence unit configured to store the pieces of unit contexts corresponding to the name of the composite context information and an instance value for identification of the application and, in response to the application being executed in the user terminal, transmit composite context information generated based on the pieces of unit contexts and the operation rule to the user terminal.

10. A method of providing composite context information corresponding to a result of performing an operation on pieces of unit context information using logical operators in a user terminal, the method comprising:

receiving an application from the user terminal;

receiving a function corresponding to the application and acquiring at least one of pieces of unit context information required for the composite context information by using a name of the composite context information required for a function requested by the application; and transmitting the acquired information from the application corresponding to an instance value for identification of the application.

11. The method of claim 10, wherein the function is a composite is a composite context information request function, further comprising:

providing the user terminal with a result of processing composite context information by combining unit context information, which constitutes composite context information requested, and information about logical operators and using a database storing ontology information.

12. The method of claim 10, wherein the function is a composite context information reservation function, further comprising:

identifying unit context information included in composite context information to be reserved, and storing the identified unit context information in a database stored in a presence table.

13. The method of claim 10, wherein the function is a composite context information notification function, further comprising:

in response to detecting occurrence of unit context information stored in a database present in a presence table, identifying composite context information including the unit context information, extracting a logical operator corresponding to the composite context, and providing a user terminal with a result of processing the composite context information by combining unit context information, which constitutes composite context information, and the extracted logical operator and using a database storing ontology information.

14. The method of claim 10, wherein the function is a composite context information addition function, further comprising:

generating fields which store information about unit context information to be mapped to composite context information requested to be added and information about logical operators to be applied to the unit context information to generate the composite context information.

15. The method of claim 10, wherein the function is a composite context information removal function, further comprising:

removing fields which store unit context information to be mapped to composite context information requested to be removed and information about logical operators to be mapped to the unit context information.

* * * * *